(12) United States Patent
Wang et al.

(10) Patent No.: US 10,770,751 B2
(45) Date of Patent: Sep. 8, 2020

(54) SOLID STATE LITHIUM-ION CONDUCTOR

(71) Applicant: SAMSUNG ELECTRONICS CO., LTD., Suwon-Si, Gyeonggi-do (KR)

(72) Inventors: Yan Wang, Brookline, MA (US); Lincoln Miara, Lincoln, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 98 days.

(21) Appl. No.: 16/205,715

(22) Filed: Nov. 30, 2018

(65) Prior Publication Data

US 2019/0356016 A1 Nov. 21, 2019

Related U.S. Application Data

(60) Provisional application No. 62/672,759, filed on May 17, 2018.

(51) Int. Cl.
*H01M 4/00* (2006.01)
*H01M 10/0562* (2010.01)
(Continued)

(52) U.S. Cl.
CPC ...... *H01M 10/0562* (2013.01); *C01G 27/006* (2013.01); *H01M 4/134* (2013.01); *H01M 4/366* (2013.01); *H01M 4/382* (2013.01); *H01M 4/405* (2013.01); *H01M 4/628* (2013.01); *H01M 10/052* (2013.01); *C01P 2002/72* (2013.01); *C01P 2002/77* (2013.01); *C01P 2006/40* (2013.01); *H01M 2004/027* (2013.01); *H01M 2300/0071* (2013.01)

(58) Field of Classification Search
CPC . C01P 2002/72; C01G 25/006; C01G 27/006; C01G 27/00; H01M 2004/027; H01M 4/134; H01M 4/399; H01M 10/052; H01M 4/405
See application file for complete search history.

(56) References Cited

U.S. PATENT DOCUMENTS

2005/0220700 A1* 10/2005 Suhara ............... H01M 4/525
423/594.4
2014/0212759 A1 7/2014 Blangero
(Continued)

FOREIGN PATENT DOCUMENTS

CN 107039634 A 8/2017

OTHER PUBLICATIONS

Amores, M., et al., "Synthesis and Ionic Conductivity Studies of In- and Y-Doped Li6HfO7 as Solid-State Electrolyte for All-Solid State Li-Ion Batteries," Journal of the Electrochemical Society, 164 (1), 2017, pp. A6395-A6400.
(Continued)

*Primary Examiner* — Cynthia H Kelly
*Assistant Examiner* — Monique M Willis
(74) *Attorney, Agent, or Firm* — Cantor Colburn LLP

(57) ABSTRACT

A compound of Formula 1:

$$Li_{6+(4-a)x+c)}M^{4+}{}_{(2-x)}A^{a+}{}_xO_{(7-c)}N'_c \qquad (1)$$

wherein M is a tetravalent cationic element, A is a divalent or trivalent cationic element, N' is an anion having a valence of less than −2, wherein when A is $Y^{3+}$, $In^{3+}$, $Zn^{2+}$, or a combination thereof, $0.15 < x \le 0.5$, otherwise $0 \le x \le 0.5$, $0 \le c \le 2$, and $((4-a)x+c) > 0$.

18 Claims, 7 Drawing Sheets

(51) Int. Cl.
*H01M 10/052* (2010.01)
*H01M 4/134* (2010.01)
*H01M 4/36* (2006.01)
*H01M 4/62* (2006.01)
*H01M 4/38* (2006.01)
*C01G 27/00* (2006.01)
*H01M 4/40* (2006.01)
*H01M 4/02* (2006.01)

(56) References Cited

U.S. PATENT DOCUMENTS

| | | |
|---|---|---|
| 2017/0271676 A1 | 9/2017 | Li et al. |
| 2017/0346060 A1 | 11/2017 | Visco et al. |
| 2018/0026300 A1 | 1/2018 | Shimizu et al. |
| 2018/0114977 A1 | 4/2018 | Sakamoto et al. |

OTHER PUBLICATIONS

Liao, Y., et al., "Li6Zr2O7 interstitial lithium-ion solid electrolyte," Electrochimica Acta 102, 2013, pp. 446-450.

* cited by examiner

SOLID STATE LITHIUM-ION CONDUCTOR

CROSS-REFERENCE TO RELATED APPLICATION

This application claims priority to U.S. Provisional Patent Application No. 62/672,759, filed on May 17, 2018, in the United States Patent and Trademark Office, and all the benefits accruing therefrom under 35 U.S.C. § 119, the content of which is incorporated herein in its entirety by reference.

BACKGROUND

1. Field

Disclosed is a solid state lithium ion conductor, a method of making the solid state lithium ion conductor, and a lithium battery including the same.

2. Description of the Related Art

Lithium metal batteries are of interest because they can potentially offer improved specific energy and energy density, and in some configurations improved power density. However, currently available materials are not sufficiently stable to lithium metal. Also, the lithium conductivity of available solid-state electrolytes is significantly less than liquid alternatives. In addition, to provide improved safety, a material which provides improved stability to air would be desirable. Thus there remains a need for an improved solid-state lithium battery material, and an electrochemical cell including the same.

SUMMARY

Disclosed is a compound of Formula 1:

$$Li_{(6+(4-a)x+c)}M^{4+}_{(2-x)}A^{a+}_{x}O_{(7-c)}N'_{c} \quad (1)$$

wherein M is a tetravalent cationic element, A is a divalent or trivalent cationic element, N' is an anion having a valence of less than −2, wherein when A is $Y^{3+}$, $In^{3+}$, $Zn^{2+}$, or a combination thereof, $0.15 < x \le 0.5$, otherwise $0 \le x \le 0.5$, $0 \le c \le 2$, and $((4-a)x+c) > 0$.

Also disclosed is an electrochemical cell including: a positive electrode; a negative electrode; and an electrolyte between the positive electrode and the negative electrode, wherein at least one of the positive electrode, the negative electrode and the electrolyte comprise the compound.

Also disclosed is a method of preparing the compound, the method comprising: contacting a compound comprising lithium, a compound comprising a tetravalent cationic element, a compound comprising at least one of divalent cationic element and a trivalent cationic element to provide a mixture; and heat-treating the mixture to prepare the compound.

Also disclosed is a method of manufacturing an electrochemical cell, the method including: providing a negative electrode comprising lithium, a lithium alloy, or combination thereof; disposing the compound of Formula 1 on the negative electrode; disposing an electrolyte on the negative electrode; and disposing a positive electrode on the electrolyte to manufacture the electrochemical cell.

The above described and other features are exemplified by the following figures and detailed description.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Disclosed are doped $Li_6Hf_2O_7$ and $Li_6Zr_2O_7$ materials, which provide improved lithium conductivity and improved stability towards lithium metal. The disclosed materials can be used to provide an improved lithium metal battery, and can be used as a protection layer on lithium metal. Also, the disclosed materials can provide improved stability to air or moisture, and can be used to reduce the likelihood of a short-circuit from lithium metal penetration through a solid separator.

Disclosed is a compound of Formula 1:

$$Li_{(6+(4-a)x+c)}M^{4+}_{(2-x)}A^{a+}_{x}O_{(7-c)}N'_{c} \quad (1)$$

wherein M is a tetravalent cationic element, A is a divalent or trivalent cationic element with a valance of a+, N' is an anion having a valence of less than −2, wherein when A is $Y^{3+}$, $In^{3+}$, $Zn^{2+}$, or a combination thereof, $0.15 < x \le 0.5$, otherwise $0 \le x \le 0.5$, $0 \le c \le 2$, and $((4-a)x+c) > 0$.

Figure 1:
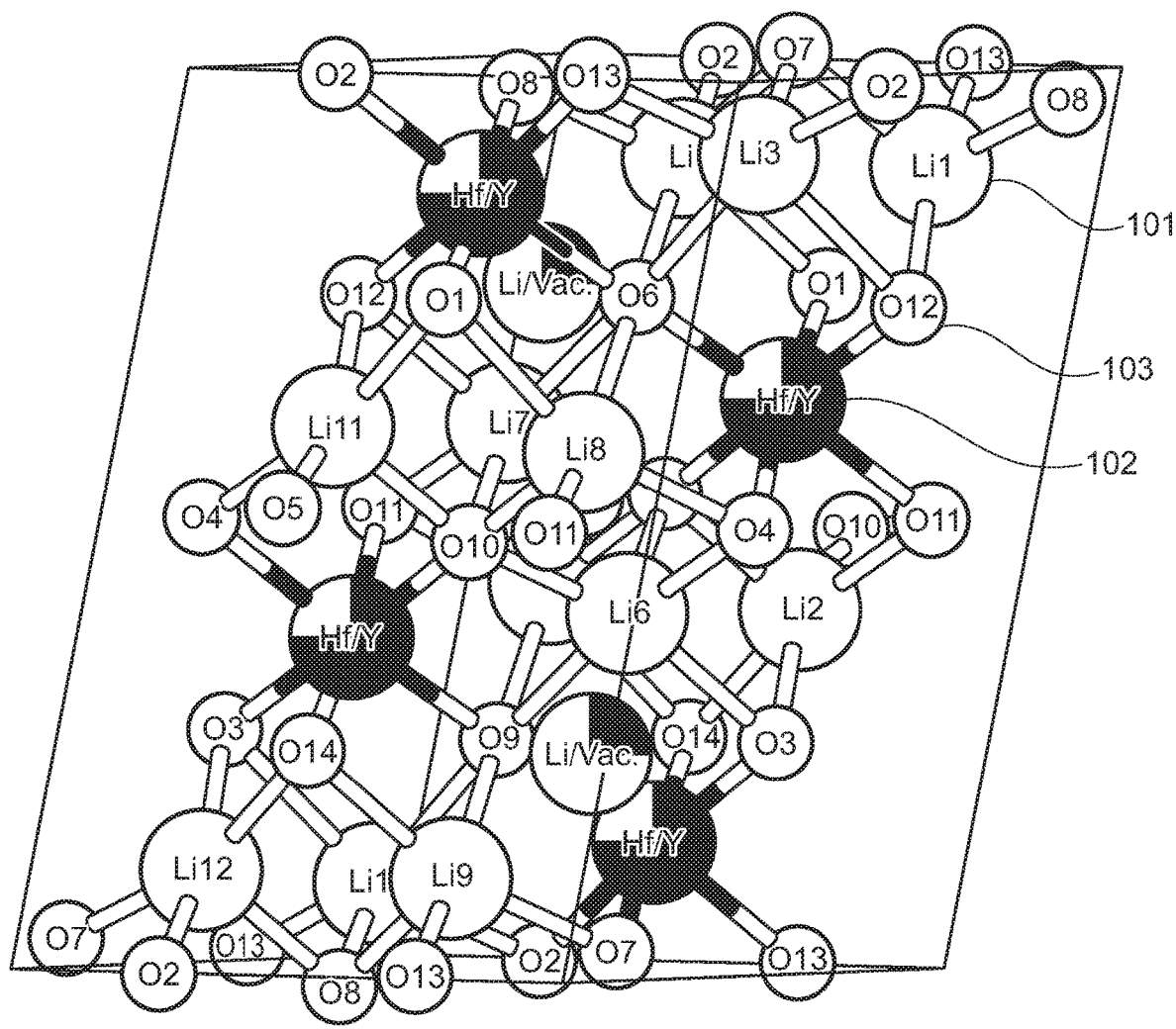
FIG. 1 is a schematic illustration of an embodiment of a doped $Li_6Hf_2O_7$-type structure having a dopant on an Hf site.

The disclosed material adopts a $Li_6Hf_2O_7$-type structure as shown in FIG. 1. As shown in FIG. 1, in the $Li_6Hf_2O_7$-type structure, the lithium 101 and the metal M 102, e.g., Hf, are coordinated by oxygen 103. As is also shown in FIG. 1, the dopant, e.g., $Y^{3+}$, is understood to reside on the Hf sites in this structure. Also, the excess lithium is understood to occupy interstitial sites 104 in the oxygen layer. Doped $Li_6Zr_2O_7$ materials adopt a similar structure. It has been surprisingly discovered that the disclosed compound provides an improved combination of stability against lithium metal and ionic conductivity relative to $Li_6Hf_2O_7$ or $Li_6Zr_2O_7$, neither of which has significant lithium ion conductivity. While not wanting to be bound by theory, it is understood that in the disclosed compound the excess lithium, e.g., a lithium stoichiometry in excess of 6 in $Li_6Hf_2O_7$ or $Li_6Zr_2O_7$, is accommodated in an interstitial crystallographic site, and the charge is compensated by cations having a valence of 2+ or 3+, i.e., less than the valence of $Hf^{4+}$ or $Zr^{4+}$, resulting in improved lithium conductivity. Also, further improvement may be provided by substitution of oxygen by an anion having a valence less than −3, e.g., a nitrogen anion ($N^{3-}$). While not wanting to be bound by theory, it is understood that, similar to substitution of the $Hf^{4+}$ or $Zr^{4+}$ by a lower valent cation, use of $N^{3-}$ provides for an increased amount of excess lithium, resulting in improved lithium conductivity. It is understood that the increased lithium content results in unexpectedly reduced activation energy, which is responsible for the observed improved lithium conductivity. For example, $Li_{6.15}Hf_{1.85}Y_{0.15}O_7$ is expected to have an activation energy of 0.43 electron volts (eV), and $Li_{6.5}Hf_{1.5}Y_{0.5}O_7$ is expected to have an activation energy of 0.20 eV. Extrapolated to room temperature, $Li_{6.15}Hf_{1.85}Y_{0.15}O_7$ is expected to provide a lithium ionic conductivity of $10^{-6}$ Siemens per centimeter (S/cm), and when extrapolated to room temperature, $Li_{6.5}Hf_{0.5}Y_{0.5}O_7$ is expected to provide a room temperature ionic conductivity of $4\times10^{-3}$ S/cm.

The metal M may comprise an element of Group 4, Group 14, or a combination thereof. An embodiment in which M is Hf, Zr, or combination thereof is mentioned. Also mentioned an embodiment in which M is Hf.

The lower valent cation A can be any suitable divalent cation, trivalent cation, or a combination thereof. The lower valent cation A may comprise a Group 2 element, a Group 3 element, a Group 12 element, a Group 13 element, a lanthanide, or a combination thereof. For example, A may comprise $Mg^{2+}$, $Ca^{2+}$, $Zn^{2+}$, $Y^{3-}$, $Ga^{3+}$, $In^{3+}$, $Al^{3+}$, $La^{3+}$, $Sc^{3+}$, $Gd^{3+}$, or a combination thereof. In an embodiment, A comprises $Mg^{2+}$, $Y^{3+}$, $Ga^{3+}$, $Sc^{3-}$, or a combination thereof.

Also, N' may be an anion of a Group 15 element, such as $N^{3-}$, for example.

In an embodiment, when A is $Y^{3+}$, $In^{3+}$, $Zn^{2+}$, or a combination thereof, $0.15<x<0.5$, $0.2<x<0.45$, or $0.25<x<0.4$. Otherwise, i.e., when A is other than $Y^{3+}$, $In^{3+}$, $Zn^{2+}$, in an embodiment $0<x\leq0.5$, $0<x<0.5$, $0.05<x<0.45$, or $0.1<x<0.4$, and $0<c<2$, $0<c<2$, $0.1<c<2$, or $0.1<c<1.5$.

The compound of Formula 1 may be according to Formula 2:

$$Li_{(6+2a'-a''+c)}M_{(2-(a'+a''))}A'_{a'}A''_{a''}O_{7-c}N'_c \quad (2)$$

wherein M is a tetravalent cationic element, A' is a divalent cationic element, A" is a trivalent cationic element, N' is an anion having a valence of less than −2, wherein when A' is $Zn^{2+}$, $0.15<a'\leq0.5$, or when A" is $Y^{2+}$ or $In^{2+}$, $0.15<a''\leq0.5$, otherwise $0\leq a'\leq 0.5$, $0\leq a''\leq 0.5$, $0\leq c\leq 1$ and $(a'+a''+c)>0$.

Also, the divalent cation A' may be $Mg^{2+}$, $Ca^{2+}$, $Zn^{2+}$, or a combination thereof. An embodiment in which A' is $Mg^{2+}$ is mentioned. The trivalent cation A" can be $Y^{3+}$, $Ga^{3+}$, $In^{3+}$, $Al^{3+}$, $La^{3+}$, $Sc^{3+}$, $Gd^{3+}$, or a combination thereof. In an embodiment, A" is $Y^{3+}$, $Ga^{3-}$, $Sc^{3+}$, or combination thereof. An embodiment in which A" is $Sc^{3+}$ is mentioned. Also, the compound may comprise nitrogen, e.g., $N^{3-}$, in which case c is greater than 0, e.g., $0<c\leq2$.

As is further disclosed above, it is believed that excess lithium resides on interstitial sites in the $Li_6Hf_2O_7$-type structure, resulting in improved lithium ionic conductivity, and the excess lithium is compensated by either use of a divalent or a trivalent cation, a nitrogen anion, or a combination thereof. In an embodiment, $0\leq a'\leq0.5$, $0\leq a'\leq0.5$, $0.05<a'<0.5$, $0.1<a'<0.45$, $0.15<a'<0.4$, or $0.2<a'<0.35$. Also, $0\leq a''\leq0.5$, $0<a''\leq0.5$, $0.05<a''<0.5$, $0.1<a''<0.45$, $0.15<a''<0.4$, or $0.2<a''<0.35$. The amount of lithium excess is greater than 0, and in Formula 2, a', a", and c may be $0<(2a'+a''+c)\leq0.5$, $0.1<(2a'+a''+c)<0.4$, $0.15<(2a'+a''+c)<0.35$, or $0.17<(2a'+a''+c)<0.3$. A lithium stoichiometry of 6.2 or 6.25 is mentioned. Also, if desired O may be substituted by N. A content of N may be $0<c\leq1$, $0.1<c\leq1$, $0.1<c<1$, $0.15<c<0.8$, $0.2<c\leq0.5$, or $0.2<c<0.4$.

Also, as is further disclosed above, the disclosed compound provides improved lithium ionic conductivity. In an embodiment, the compound provides an ionic conductivity of $1\times10^{-2}$ to $1\times10^{-6}$ Siemens per centimeter (S/cm), $3\times10^{-2}$ to $5\times10^{-5}$ S/cm, $6\times10^{-2}$ to $1\times10^{-4}$ S/cm, $9\times10^{-2}$ to $5\times10^{-4}$ S/cm, or $10^{-3}$ S/cm, when determined at 300 Kelvin (K), about 27° C. Also, the compound of Formula 1 provides an ionic conductivity of $1\times10^{-2}$ to $1\times10^{-6}$ S/cm, $3\times10^{-2}$ to $5\times10^{-5}$ S/cm, $6\times10^{-2}$ to $1\times10^{-4}$ S/cm, $9\times10^{-2}$ to $5\times10^{-4}$ S/cm, or $10^{-3}$ S/cm, when determined at 330 Kelvin (K), about 57° C.

Specifically disclosed are the compounds disclosed in Table 1. Also provided in Table 1 is the energy above hull, which is the energy of decomposition of the material into the set of most stable materials at this chemical composition, in eV/atom. Stability is tested against all potential chemical combinations that result in the material's composition. For example, a $Co_2O_3$ structure would be tested for decomposition against other $Co_2O_3$ structures, against Co, and $O_2$ mixtures, and against CoO and $O_2$ mixtures.

TABLE 1

| Dopant Type | Doped compositions | Energy above hull (meV/atom) | Doped compositions | Energy above hull (meV/atom) |
|---|---|---|---|---|
| $A^{3+}$ | $Li_{49}Hf_{15}YO_{56}$ | 12.4 | $Li_{49}Zr_{15}YO_{56}$ | 10.5 |
| | $Li_{50}Hf_{14}Y_2O_{56}$ | 22.9 | $Li_{50}Zr_{14}Y_2O_{56}$ | 19.5 |
| | $Li_{51}Hf_{13}Y_3O_{56}$ | 31.1 | $Li_{51}Zr_{13}Y_3O_{56}$ | 26.9 |
| | $Li_{52}Hf_{12}Y_4O_{56}$ | 34.5 | $Li_{52}Zr_{12}Y_4O_{56}$ | 30.7 |
| | $Li_{49}Hf_{15}GdO_{56}$ | 13.6 | $Li_{49}Zr_{15}GdO_{56}$ | 11.8 |
| | $Li_{50}Hf_{14}Gd_2O_{56}$ | 25.3 | $Li_{50}Zr_{14}Gd_2O_{56}$ | 21.6 |
| | $Li_{51}Hf_{13}Gd_3O_{56}$ | 33.8 | $Li_{51}Zr_{13}Gd_3O_{56}$ | 29.1 |
| | $Li_{52}Hf_{12}Gd_4O_{56}$ | 37.7 | $Li_{52}Zr_{12}Gd_4O_{56}$ | 33.2 |
| | $Li_{49}Hf_{15}GaO_{56}$ | 14.4 | $Li_{49}Zr_{15}GaO_{56}$ | 14.2 |
| | $Li_{49}Hf_{15}InO_{56}$ | 10.0 | $Li_{49}Zr_{15}InO_{56}$ | 9.3 |
| | $Li_{49}Hf_{15}AlO_{56}$ | 15.1 | $Li_{49}Zr_{15}AlO_{56}$ | 15.2 |
| | $Li_{49}Hf_{15}LaO_{56}$ | 18.9 | $Li_{49}Zr_{15}LaO_{56}$ | 16.1 |
| | $Li_{49}Hf_{15}ScO_{56}$ | 9.3 | $Li_{49}Zr_{15}ScO_{56}$ | 9.0 |
| $A^{2+}$ | $Li_{50}Hf_{15}ZnO_{56}$ | 23.6 | $Li_{50}Zr_{15}ZnO_{56}$ | 21.2 |
| | $Li_{50}Hf_{15}MgO_{56}$ | 21.1 | $Li_{50}Zr_{15}MgO_{56}$ | 20.1 |
| | $Li_{50}Hf_{15}CaO_{56}$ | 23.1 | $Li_{50}Zr_{15}CaO_{56}$ | 21.6 |

TABLE 1-continued

| Dopant Type | Doped compositions | Energy above hull (meV/atom) | Doped compositions | Energy above hull (meV/atom) |
|---|---|---|---|---|
| $N^{3-}$ | $Li_{49}Hf_{16}O_{55}N$ | 10.0 | $Li_{49}Zr_{16}O_{55}N$ | 11.8 |
| | $Li_{50}Hf_{16}O_{54}N_2$ | 19.0 | $Li_{50}Zr_{16}O_{54}N_2$ | 22.4 |
| | $Li_{51}Hf_{16}O_{53}N_3$ | 23.7 | $Li_{51}Zr_{16}O_{53}N_3$ | 27.1 |
| | $Li_{52}Hf_{16}O_{52}N_4$ | 31.3 | $Li_{52}Zr_{16}O_{52}N_4$ | 40.5 |

The disclosed compound can be used in a component in a lithium battery, e.g., a lithium secondary electrochemical cell. The component may be a positive electrode, a negative electrode, the electrolyte, or a separator. In an embodiment, the compound is used in a plurality of the positive electrode, negative electrode, electrolyte, or separator. Mentioned is an embodiment in which the compound is used as a protection layer on lithium metal, or a lithium metal alloy. While not wanting to be bound by theory, the improved lithium ion conductivity and the stability of the compound towards lithium, provide an improved ability to protect lithium from air, water, or components of an electrolyte that may otherwise react with the lithium.

Figure 2:
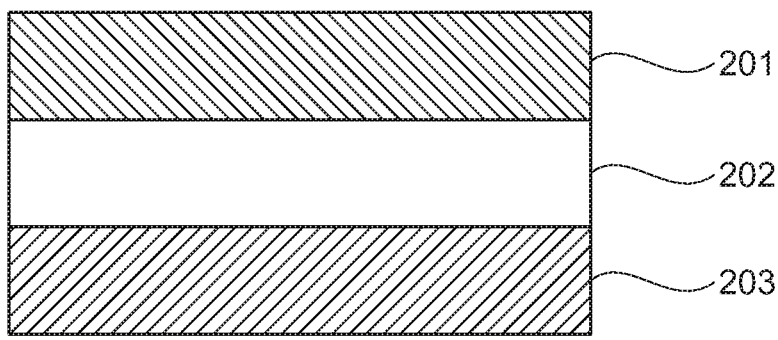
FIG. 2 is a schematic illustration of an embodiment of a protected negative electrode.

Disclosed is a protected negative electrode for a lithium battery comprising lithium, and the compound on a surface of the lithium. As shown in FIG. 2, the negative electrode may comprise a layer 201 of the compound on lithium or a lithium metal alloy 202. If desired, a current collector 203, e.g., a copper or aluminum foil, may also be provided.

Alternatively, the lithium or lithium alloy may be in the form of a particle, and the compound may be disposed on a surface of the particle to provide a protected lithium particle 301. The protected lithium particle may have any suitable size, e.g., 0.1 to 10 micrometers (μm), or 0.5 to 5 μm. The protected lithium particle 301 may comprise a core 302 comprising lithium or a lithium alloy, and protective shell 303 comprising the compound on a surface of the core.

Figure 3:
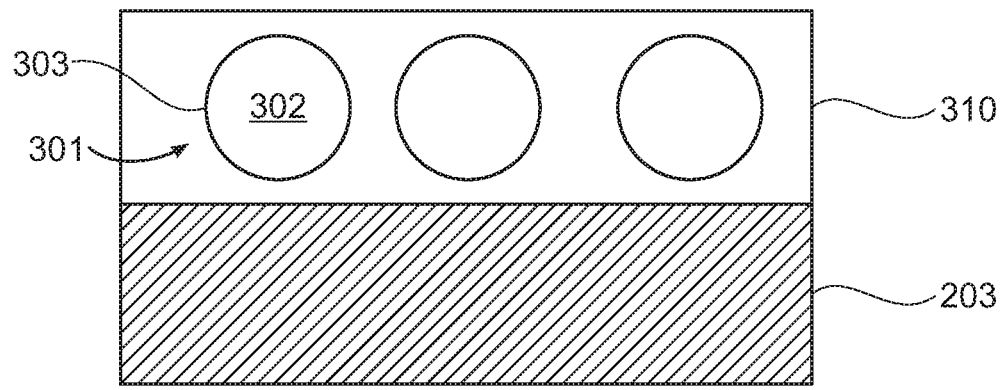
FIG. 3 is a schematic illustration of an embodiment of a negative electrode including a protected lithium particle.

The protected lithium particle may be combined with a conductive agent, if desired, and a binder, if desired, to provide a composite negative electrode 310 comprising the protected lithium particle. As shown in FIG. 3, a composite negative electrode 310 comprising the protected lithium particle 301 may be on the current collector 203.

The conductive agent can include, for example, carbon black, carbon fiber, graphite, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing can be used. The negative electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing can be used. The amount of the conductive agent can be in a range of about 1 part by weight to about 10 parts by weight, for example, in a range of about 2 parts by weight to about 7 parts by weight, based on a total weight of the negative active material. When the amount of the binder is in the range above, e.g., about 1 part by weight to about 10 parts by weight, the electrical conductivity of the negative electrode may be suitable.

The binder can facilitate adherence between components of the negative electrode, and adherence of the negative electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the negative active material. When the amount of the binder is in the range above, e.g., about 1 part by weight to about 10 parts by weight, the adherence of the negative electrode to the current collector may be suitably strong.

The protected negative electrode may be used in combination with a solid-state electrolyte, a liquid electrolyte, or a combination thereof. Also, the disclosed compound may be used as a solid state electrolyte alone, or in combination with another solid-state electrolyte.

The solid-electrolyte may comprise the disclosed compound, and optionally a sulfide solid electrolyte, for example lithium sulfide, silicon sulfide, phosphorus sulfide, boron sulfide, or a combination thereof. The sulfide-based solid electrolyte particle can comprise $Li_2S$, $P_2S_5$, $SiS_2$, $GeS_2$, $B_2S_3$, or a combination thereof. The sulfide-based solid electrolyte particle can be $Li_2S$ or $P_2S_5$. The sulfide-based solid electrolyte particle is known for its high lithium ion conductivity compared to that of other inorganic compounds. In a preferred embodiment, the solid electrolyte comprises $Li_2S$ and $P_2S_5$. When the sulfide solid electrolyte material constituting the solid electrolyte includes $Li_2S$—$P_2S_5$, a mixing molar ratio of $Li_2S$ to $P_2S_5$ can range, for example, from about 50:50 to about 90:10.

In addition, an inorganic solid electrolyte prepared by adding $Li_3PO_4$, a halogen, a halogen compound, $Li_{2+2x}Zn_{1-x}GeO_4$ ("LISICON"), $Li_{3+y}PO_{4-x}N_x$ ("LIPON"), $Li_{3.25}Ge_{0.25}P_{0.75}S_4$ ("Thio-LISICON"), $Li_2O$—$Al_2O_3$—$TiO_2$—$P_2O_5$ ("LATP"), or the like to an inorganic solid electrolyte of $Li_2S$—$P_2S_5$, $SiS_2$, $GeS_2$, $B_2S_3$, or a combination thereof can be as used as a sulfide solid electrolyte. Non-limiting examples of the sulfide solid electrolyte material include $Li_2S$—$P_2S_5$; $Li_2S$—$P_2S_5$—LiX where X is a halogen element; $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$-ZmSn where m and n are positive numbers, and Z is Ge, Zn, or G; $Li_2S$—$GeS_2$; $Li_2SSiS_2$—$Li_3PO_4$; and $Li_2S$—$SiS_2$—$Li_pMO_q$ where p and q are positive numbers, and M is P, Si, Ge, B, Al, Ga, or In. In this regard, the sulfide-based solid electrolyte material is prepared by treating a raw starting material (e.g., $Li_2S$, $P_2S_5$, or the like) of a sulfide-based solid electrolyte material by a melt quenching method, a mechanical milling method, or the like. In addition, a calcination process may be performed after treatment.

The solid electrolyte can be in the form of a particle, and can have, for example, a spherical form, an oval-spherical form, or the like. The particle diameter of the solid electrolyte is not particularly limited, and the solid electrolyte can have a mean particle diameter ranging, for example, from about 0.01 to about 30 µm, for example, about 0.1 to about 20 µm. A mean particle diameter refers to a number average diameter (D50) of the particle size distribution of particles obtained by scattering, or the like. The solid electrolyte can be prepared, for example, by melt quenching or mechanical milling. For example, when melt quenching is used, $Li_2S$ and $P_2S_5$ can be mixed in certain amounts to prepare a pellet form, and the prepared pellet form can be allowed to react in a vacuum state at a predetermined reaction temperature, followed by quenching, thereby completing the preparation of the sulfide-based solid electrolyte material. In addition, the reaction temperature of the mixture of $Li_2S$ and $P_2S_5$ ranges from, for example, about 200 to about 800° C., for example, about 300 to about 600° C. In addition, reaction time can range from, for example, about 0.1 to about 24 hours, for example, about 1 to about 12 hours. In addition, a quenching temperature of the reaction product can be about 10° C. or less, for example, about 0° C. or less, and a quenching rate of the reaction product can range from about 1° C./second (sec) to about 10,000° C./sec, for example, about 1° C./sec to about 1,000° C./sec. In addition, when mechanical milling is used, the starting materials, e.g., $Li_2S$ and $P_2S_5$, can be combined using a ball mill or the like, thereby preparing a sulfide-based solid electrolyte material. In addition, a stirring rate and stirring time of the mechanical milling method are not particularly limited, but the faster the stirring rate, the faster the production rate of the sulfide-based solid electrolyte material, and the longer the stirring time, the greater the conversion rate of raw materials into the sulfide-based solid electrolyte material. Thereafter, the sulfide-based solid electrolyte material obtained by melt quenching or mechanical milling can be heat-treated at a predetermined temperature and then pulverized, thereby preparing the solid electrolyte having a particle shape.

The solid electrolyte obtained using the method can be deposited using a film formation method, for example, by blasting, aerosol deposition, cold spraying, sputtering, chemical vapor deposition ("CVD"), spraying, or the like, thereby preparing a solid electrolyte layer. In addition, the solid electrolyte layer can be formed by pressing the solid electrolyte. In addition, the solid electrolyte layer can be formed by mixing the solid electrolyte, a solvent, and a binder or a support and pressing the resulting mixture. In this case, the solvent or the support is added to reinforce the strength of the solid electrolyte layer or prevent short-circuit of the solid electrolyte.

The liquid electrolyte may comprise a polar aprotic solvent and a lithium salt. The polar aprotic solvent can be dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, fluoroethylene carbonate, methyl acetate, ethyl acetate, n-propyl acetate, dimethylacetate, methyl propionate, ethyl propionate, γ-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, and sulfolane, but the organic solvent is not limited thereto and any suitable solvent can be used. In an embodiment, the solvent preferably comprises a carbonate ester, and more preferably comprises ethylene carbonate and propylene carbonate.

The lithium salt may comprise $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (in which the x and y are natural numbers, e.g., an integer of 1 to 20), LiCl, LiI, $LiB(C_2O_4)_2$ (lithium bisoxalatoborate (LiBOB)), lithium bis (fluorosulfonyl)imide (LiFSI), or a combination thereof. The concentration of the lithium salt may be 0.1 to 2 molar (M), e.g., 0.5 to 1.3 M in the aprotic solvent.

Figure 4A:
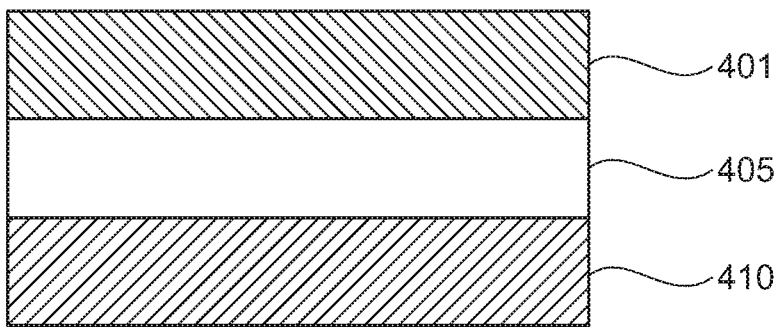
FIG. 4A is a schematic illustration of an embodiment of a solid-state electrochemical cell.

In an electrochemical cell, a schematic illustration of which is shown in FIG. 4A, the negative electrode 401, e.g., the protected negative electrode, may be used in combination with a positive electrode 410 comprising a positive active material. A solid-state electrolyte 405 may serve to electrically separate the positive electrode and the negative electrode.

Figure 4B:
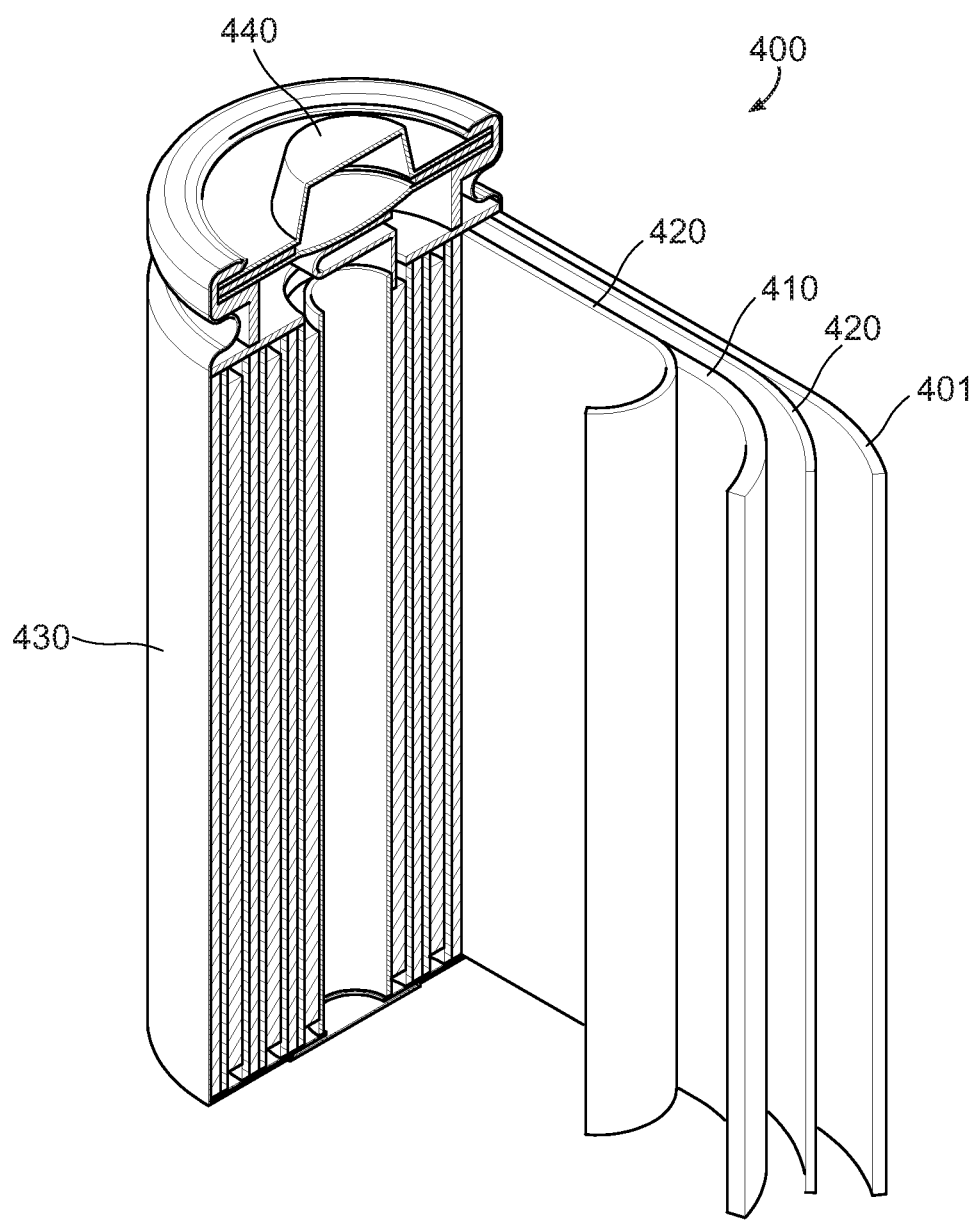
FIG. 4B is a schematic illustration of an embodiment of an electrochemical cell including a liquid electrolyte.

Alternatively, as shown in the electrochemical cell 400 of FIG. 4B, the negative electrode 401, e.g., the protected negative electrode, can be used in combination with a positive electrode 410 comprising the positive active material and a separator 420 optionally provided between the positive electrode and the negative electrode. The electrochemical cell of FIG. 4B may comprise the liquid electrolyte. Also shown in FIG. 4B is a can 430 and the header 440.

The positive active material may comprise a lithium intercalation compound that reversibly intercalates and deintercalates lithium ions. In an implementation, the lithium intercalation compound comprises a composite oxide of lithium and a metal of cobalt, manganese, nickel, or a combination thereof may be used. Examples thereof include: $Li_xQ_{1-y}R_yD_2$ (0.90≤x≤1.8 and 0≤y≤0.5); $Li_xE_{1-y}R_yO_{2-z}D_z$ (0.90≤x≤1.8, 0≤y≤0.5, 0≤z≤0.05); $Li_xE_{2-y}R_yO_{4-z}D_z$ (0.90≤x≤1.8, 0≤y≤0.5, 0≤z≤0.05); $Li_xNi_{1-y-z}Co_yR_zD_\alpha$ (0.90≤x≤1.8, 0≤y≤0.5, 0≤z≤0.05, 0<α≤2); $Li_xNi_{1-y-z}Co_yR_zO_{2-\alpha}T_\alpha$ (0.90≤x≤1.8, 0≤y≤0.5, 0≤z≤0.05, 0<α<2); $Li_xNi_{1-y-z}Co_yR_zO_{2-\alpha}T_2$ (0.90≤x≤1.8, 0≤y≤0.5, 0≤z≤0.05, 0<α<2); $Li_xNi_{1-y-z}Mn_yR_zD_\alpha$ (0.90≤x≤1.8, 0≤y≤0.5, 0≤z≤0.05, 0<α≤2); $Li_xNi_{1-y-z}Mn_yR_zO_{2-\alpha}T_\alpha$ (0.90≤x≤1.8, 0≤y≤0.5, 0≤z≤0.05, 0<α<2); $Li_xNi_{1-y-z}Mn_yR_zO_{2-\alpha}T_2$ (0.90≤x≤1.8, 0≤y≤0.5, 0≤z≤0.05, 0<α<2); $Li_xNi_yE_zG_dO_2$ (0.90≤x≤1.8, 0≤y≤0.9, 0≤z≤0.5, 0.001≤d≤0.1); $Li_xNi_yCo_zMn_dG_eO_2$ (0.90≤x≤1.8, 0≤y≤0.9, 0≤z≤0.5, 0≤d≤0.5, 0.001≤e≤0.1); $Li_xNiG_yO_2$ (0.90≤x≤1.8, 0.001≤y≤0.1); $Li_xCoG_yO_2$ (0.90≤x≤1.8, 0.001≤y≤0.01); $Li_xMnG_yO_2$ (0.90≤x≤1.8, 0.001≤y≤0.1); $Li_xMn_2G_yO_4$ (0.90≤x≤1.8, 0.001≤y≤0.01); $Q'O_2$; $Q'S_2$; $LiQ'S_2$; $V_2O_5$; $LiV_2O_5$; $LiQ''O_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, Q may be Ni, Co, Mn, or a combination thereof; R may be Al, Ni, Co, Mn, Cr, Fe, Mg, Sr, V, a rare earth element, or a combination thereof; D may be O, F, S, P, or a combination thereof, E may be Co, Mn, or a combination thereof, T may be F, S, P, or a combination thereof; G may be Al, Cr, Mn, Fe, Mg, La, Ce, Sr, V, or a combination thereof; Q' may be Ti, Mo, Mn, or a combination thereof; Q" may be Cr, V, Fe, Sc, Y, or a combination thereof; and J may be V, Cr, Mn, Co, Ni, Cu, or a combination thereof.

For example, the positive active material may be a NCA-based material represented by $Li_xNi_yE_zG_dO_2$ (wherein 0.90≤x≤1.8, 0≤y≤0.9, 0≤z≤0.5, 0.001≤d≤0.1, E is Co, Mn, or a combination thereof, and G is Al, Cr, Mn, Fe, Mg, La, Ce, Sr, V, or a combination thereof). In an implementation, the positive active material may include, e.g., lithium cobalt oxide, lithium nickel cobalt manganese oxide, lithium nickel cobalt aluminum oxide, or a combination thereof.

If desired, the separator may be included between the negative electrode and the positive electrode. The separator may include suitable materials that separate a negative electrode from a positive electrode and provide a transporting passage for lithium ions. For example, the separator may have a low resistance to ion transportation and an excellent impregnation for an electrolyte. For example, it may be selected from a glass fiber, polyester, polyethylene, polypropylene, polytetrafluoroethylene (PTFE), or a combination thereof. It may have a form of a non-woven fabric or a woven fabric.

The disclosed compound may be prepared by contacting a compound comprising lithium, a compound comprising a tetravalent cationic element, a compound comprising at least one of divalent cationic element and a trivalent cationic element to provide a mixture; and heat-treating the mixture to prepare the compound.

Suitable compounds comprising lithium include oxides, nitrides, oxynitrides, nitrates, hydroxides, and carbonates comprising lithium. Lithium carbonate and lithium nitrate are mentioned.

Suitable compounds comprising the tetravalent cationic element include oxides, nitrides, oxynitrides, nitrates, hydroxides, and carbonates comprising an element that can be a tetravalent cation, e.g., an element of Group 4, Group 14, or a combination thereof, such as Zr or Hf. Use of zirconium oxide, hafnium oxide, or a combination thereof are mentioned.

Suitable compounds comprising the divalent cationic element include oxides, nitrides, oxynitrides, nitrates, hydroxides, and carbonates comprising an element that can be a divalent cation, e.g., an alkaline earth metal, a Group 12 element, or a combination thereof. Use of $MgCO_3$, $CaCO_3$, ZnO, or a combination thereof is mentioned.

Suitable compounds comprising the trivalent cationic element include oxides, nitrides, oxynitrides, nitrates, hydroxides, and carbonates comprising an element that can be a trivalent cation, e.g., a Group 3 element, a lanthanide, a Group 13 element, or a combination thereof. Scandium oxide, yttrium oxide, lanthanum oxide, gadolinium oxide, gallium oxide, indium oxide, aluminum oxide, or a combination thereof may be used.

The compound may be prepared by contacting starting materials in suitable amounts, e.g., stoichiometric amounts, to form a mixture, and heat-treating the mixture. The contacting may comprise milling, e.g., ball milling, or grinding.

The heat-treatment may be in air at a suitable temperature, e.g., 500° C. to 1000° C., 600° C. to 900° C., or 700° C. to 800° C., for a suitable time, e.g., 1 to 100 hours, 2 to 75 hours, or 4 to 48 hours.

In an embodiment, the compound comprises nitrogen. The nitrogen may be included by contacting the starting materials with a gas comprising nitrogen, e.g., nitrogen gas or ammonia, or a combination thereof, at a suitable temperature, e.g., 500° C. to 1000° C., 600° C. to 900° C., or 700° C. to 800° C., for a suitable time, e.g., 1 to 100 hours, 2 to 75 hours, or 4 to 48 hours. Contacting with ammonia at 800° is mentioned.

EXAMPLES

Example 1

Preparation of $Li_{6.5}Hf_{1.5}Y_{0.5}O_7$ by Microwave Assisted Synthesis

All reagents used as supplied. $LiOH.H_2O$ (98%), $HfO_2$ (99.99%), and $Y_2O_3$ (99.9%) were combined in stoichiometric amounts and mixed in a ball mill for 20 minutes at 20 Hertz (Hz) with stainless steel milling media to provide a powder. The powder was compressed at 3 tons to provide a pellet. The pellet was heated at 700° C. for 6 hours in a 2.45 GHz microwave furnace ((Phoenix) to provide an intermediate product. The intermediate product was ground and then pressed at 3 tons to provide a pellet, and the pellet heat-treated 2° C. per minute to 900° C., and then ramped to 700° C. over 6 hours to provide $Li_{6.5}Hf_{1.5}Y_{0.5}O_7$.

Example 2

Preparation of $Li_{6.5}Hf_{1.5}In_{0.5}O_7$ by Microwave Assisted Synthesis

All reagents used as supplied. $LiOH.H_2O$ (98%), $HfO_2$ (99.99%), and $In_2O_3$ (99.997%) were combined in stoichiometric amounts and mixed in a ball mill for 20 minutes at 20 Hertz (Hz) with stainless steel milling media to provide a powder. The powder was compressed at 3 tons to provide a pellet. The pellet was heated at 700° C. for 6 hours in a 2.45 GHz microwave furnace (Phoenix) to provide an intermediate product. The intermediate product was ground and then pressed at 3 tons to provide a pellet, and the pellet heat-treated 2° C. per minute to 900° C., and then ramped to 700° C. over 6 hours to provide $Li_{6.5}Hf_{1.5}In_{0.5}O_7$.

Example 3

Preparation of $Li_{6.1}Hf_{1.9}Sc_{0.1}O_7$

Using the same method as Example 1, and $Sc_2O_3$ instead of $Y_2O_3$, $Li_{6.1}Hf_{1.9}Sc_{0.1}O_7$ was prepared.

Example 4

Preparation of $Li_{6.25}Hf_{1.875}Mg_{0.125}O_7$

Using the same method as Example 1, and MgO instead of $Y_2O_3$, $Li_{6.25}Hf_{1.875}Mg_{0.125}O_7$ was prepared.

Comparative Example 1

Preparation of $Li_6Hf_2O_7$

Using the same method as Example 1, and omitting the $Y_2O_3$, $Li_6Hf_2O_7$ was prepared.

Prophetic Example 1

$Li_{6.1}Zr_{1.9}Gd_{0.1}O_7$

Stoichiometric amounts of $ZrO_2$ and $Gd_2O_3$, and a 10% stoichiometric excess of $LiOH.H_2O$, will be mixed and heat treated at 800° C. for 20 hours in air in covered alumina crucible to provide $Li_{6.1}Zr_{1.9}Gd_{0.1}O_7$.

Prophetic Example 2

$Li_{6.1}Zr_2O_{6.9}N_{0.1}$

Stoichiometric amounts of $ZrO_2$ and $Li_3N$, and a 10% stoichiometric excess of $LiOH \cdot H_2O$, will be mixed and heat treated at 800° C. for 20 hours in air in covered alumina crucible to provide $Li_{6.1}Zr_2O_{6.9}N_{0.1}$.

Prophetic Example 3

$Li_{6.25}Hf_2O_{6.75}N_{0.25}$

Stoichiometric amounts of $HfO_2$ and $Li_3N$, and a 10% stoichiometric excess of $LiOH \cdot H_2O$, will be mixed and heat treated at 800° C. for 20 hours in air in covered alumina crucible to provide $Li_{6.25}Hf_2O_{6.75}N_{0.25}$.

Analysis Example 1

X-ray Diffraction Analysis of Comparative Example 1, Example 3, and Example 4

Figure 5:
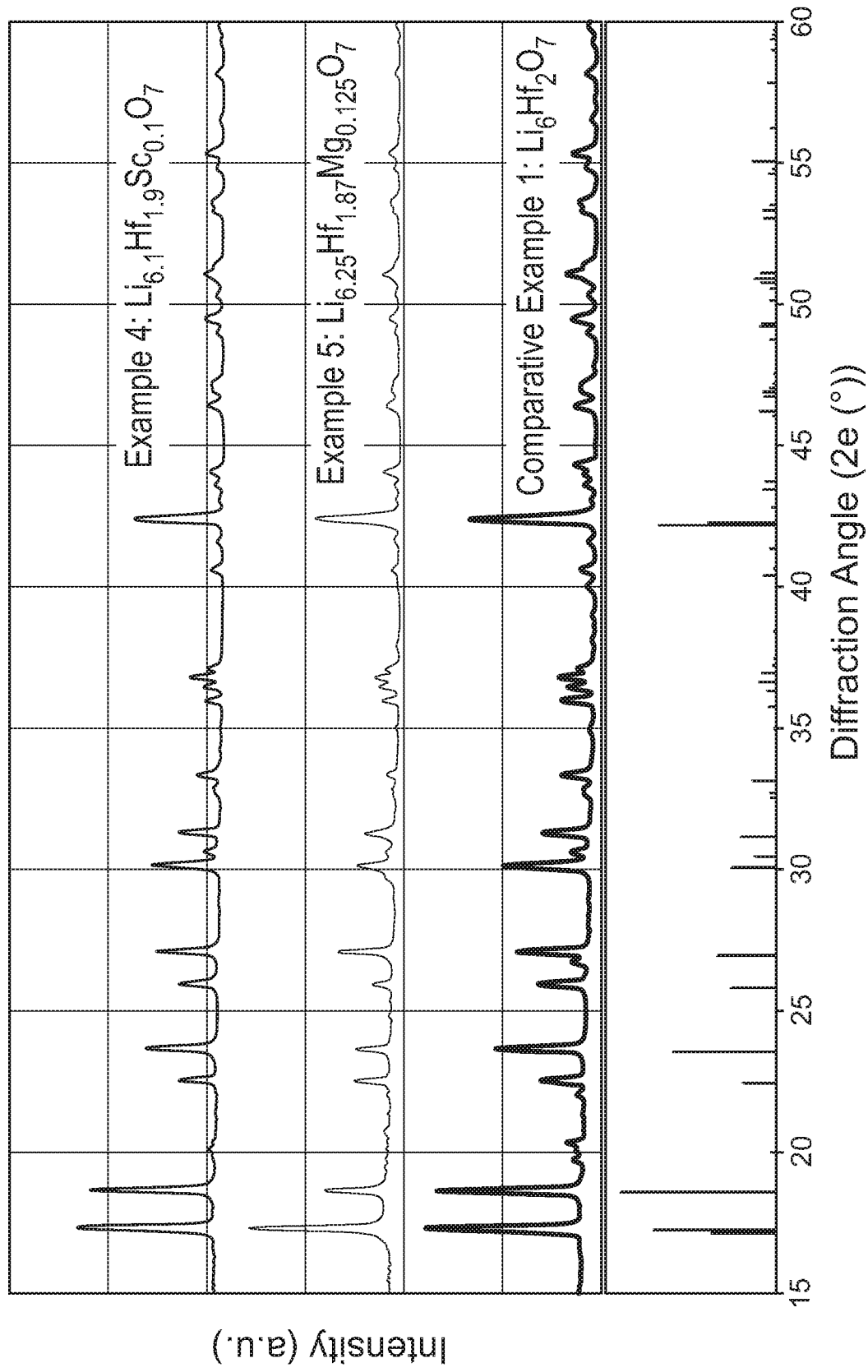
FIG. 5 is a graph of intensity (arbitrary units (a.u.) versus diffraction angle (degrees two-theta, 2θ) showing the results of X-ray powder diffraction analysis of the products of Examples 4 and 5, and Comparative Example 1.

The products of Comparative Example 1, Example 3, and Example 4 were analyzed by powder X-ray diffraction using Cu Kα radiation, the results of which are shown in FIG. 5 along with a calculated pattern for $Li_6Hf_2O_7$ (ICDD 04-009-5022). These results show that the product of Comparative Example 1, and the products of Examples 3 and 4, each have the $Li_6Hf_2O_7$ structure.

Analysis Example 2

Ionic Conductivity

Figure 6:
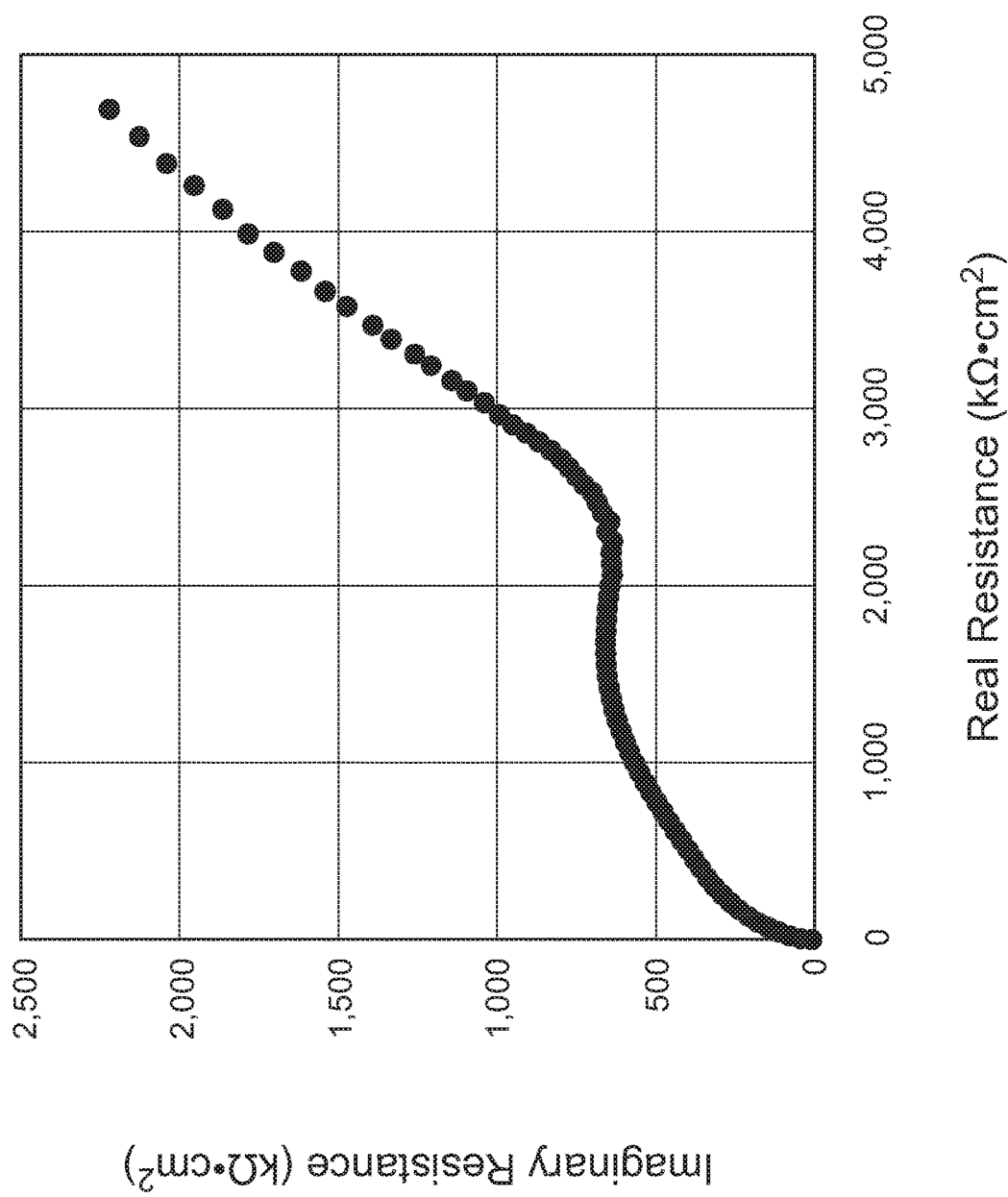
FIG. 6 is a graph of imaginary resistance (kiloohms-square centimeters, kΩ·cm$^2$) versus real resistance (kΩ·cm$^2$) showing the results of conductivity analysis of the $Li_{6.1}Hf_{1.9}Sc_{0.1}O_7$ of Example 3.
Figure 7A:
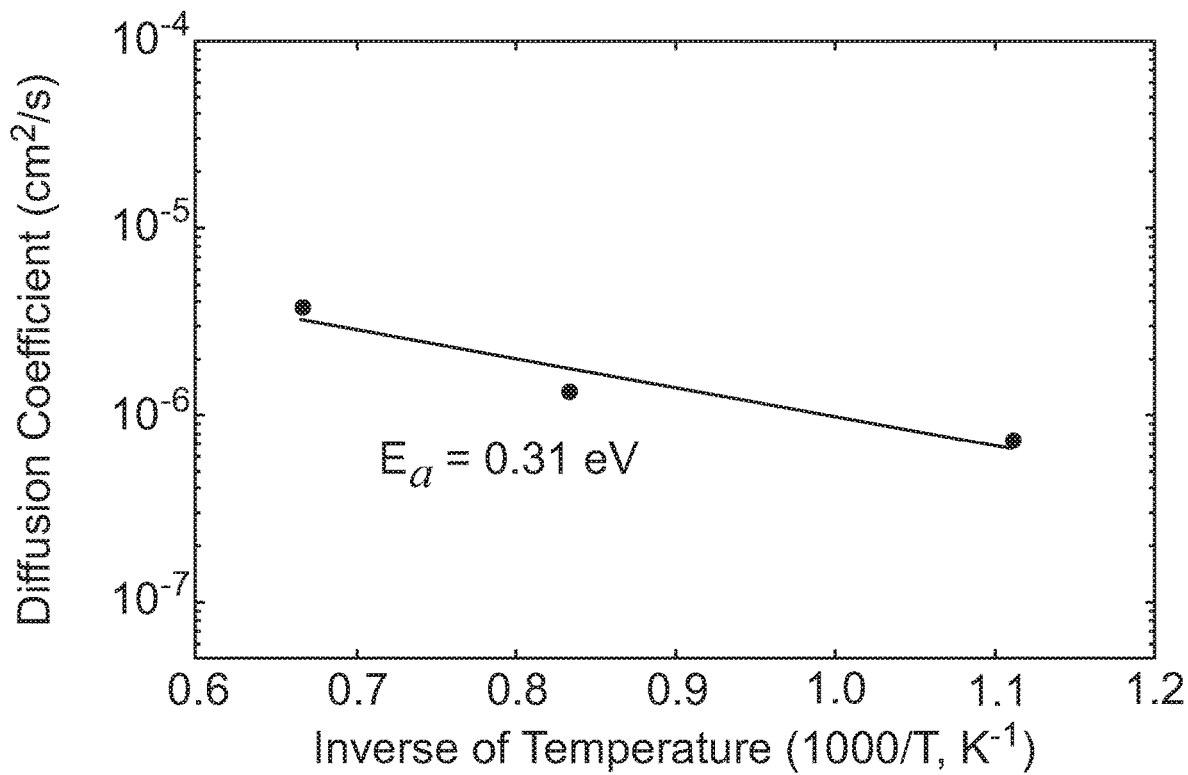
FIGS. 7A to 7D are each an Arrhenius plot and are a graph of diffusion coefficient (cm$^2$/s) versus the inverse of temperature (1000/T, K$^{-1}$) for $Li_{6.125}Hf_{1.875}Y_{0.125}O_7$, $Li_{6.5}Hf_{1.5}Y_{0.5}O_7$, $Li_{6.125}Hf_2O_{6.875}N_{0.125}$, and $Li_{6.25}Hf_{1.875}Mg_{0.125}O_7$, respectively, determined by ab initio molecular dynamics calculation.
Figure 7B:
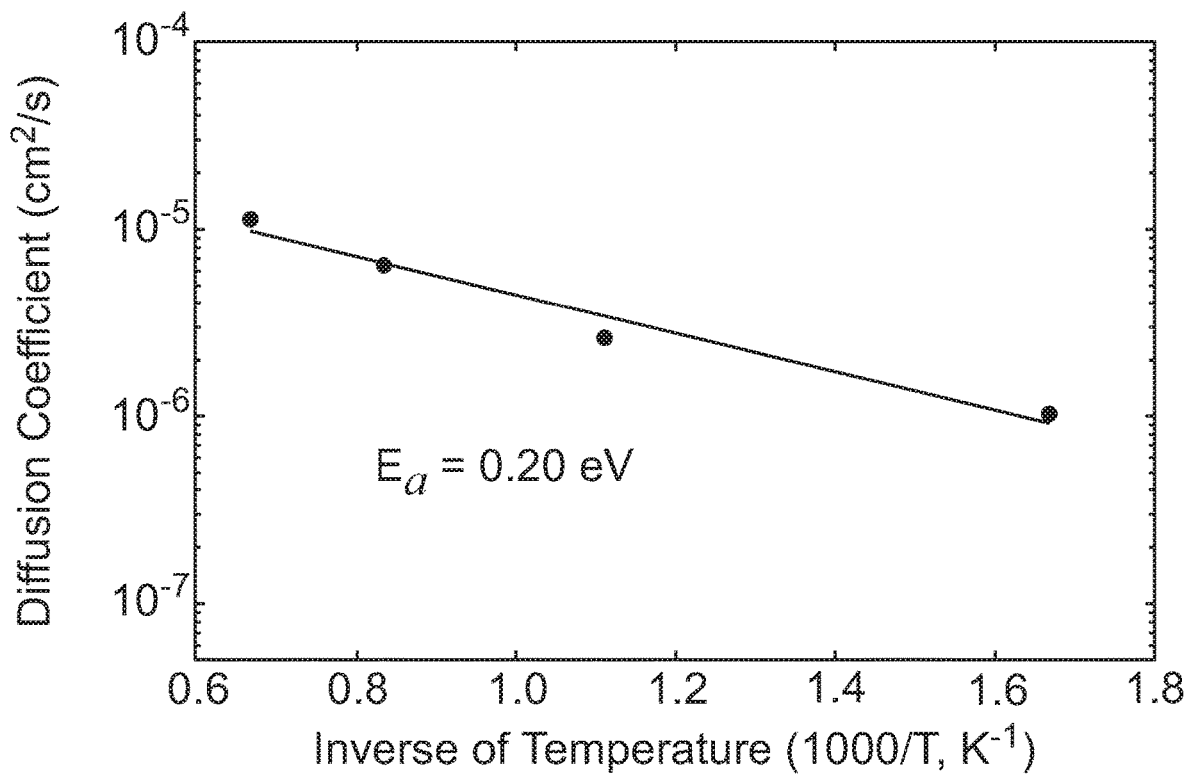
Figure 7C:
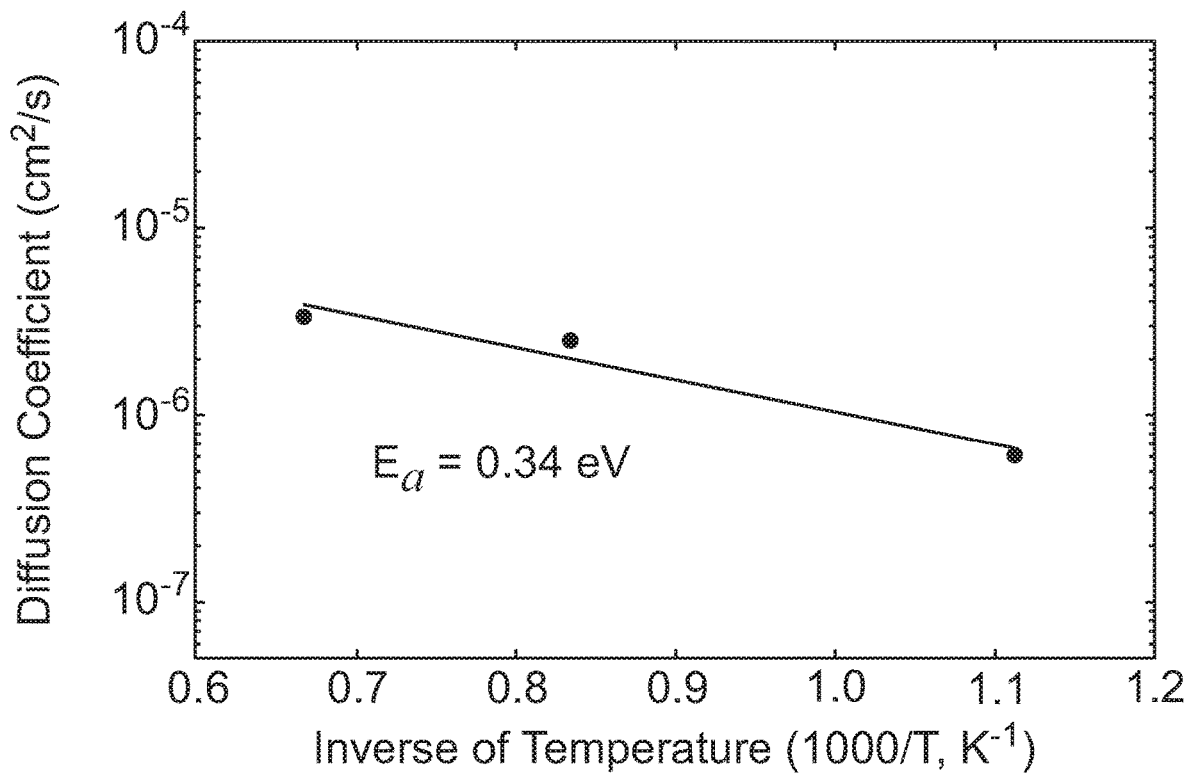
Figure 7D:
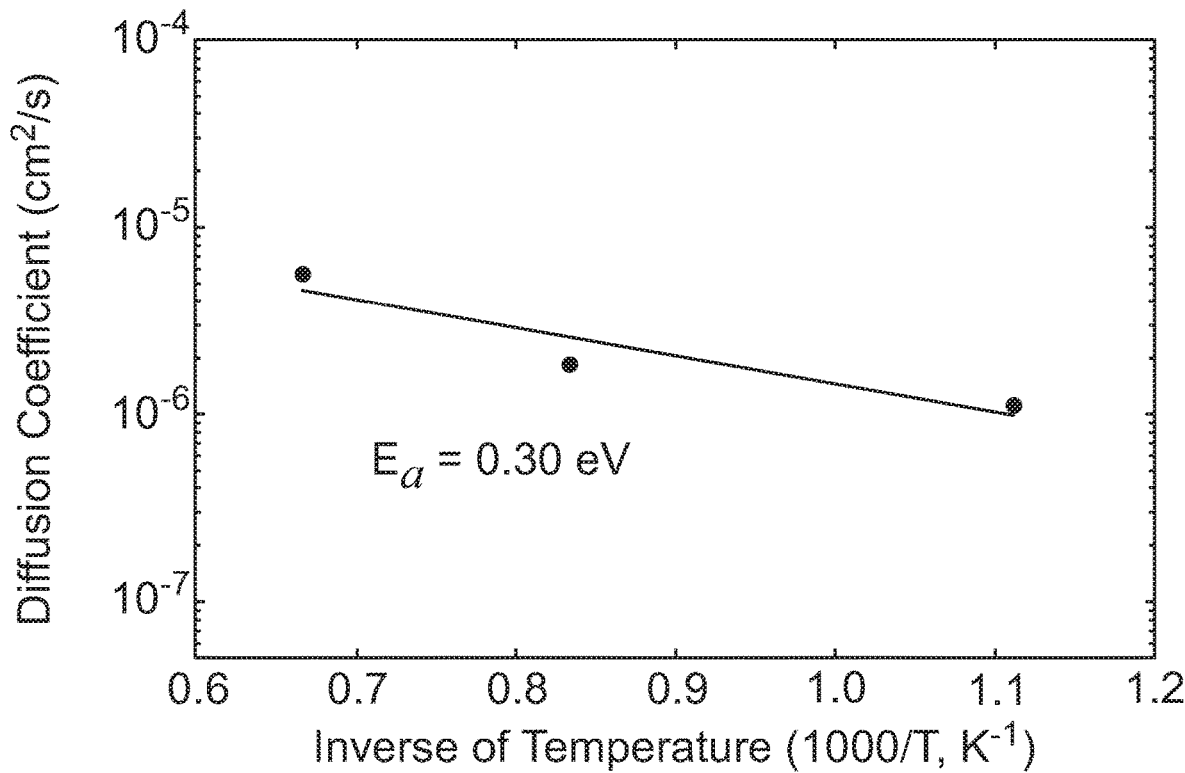

The ionic conductivity of the $Li_{6.1}Hf_{1.9}Sc_{0.1}O_7$ was analyzed by placing a pellet having a thickness of 1.33 millimeters (mm) and an area of 0.984 $cm^2$ between silver electrodes. FIG. 6 is a Nyquist plot showing the results of the analysis. The conductivity was determined to be $6 \times 10^{-8}$ at 27° C.

The ionic conductivity of $Li_{6.125}Hf_{1.87}Y_{0.125}O_7$, $Li_{6.125}Hf_2O_{6.87}N_{0.125}$, and $Li_{6.25}Hf_{1.87}Mg_{0.125}O_7$ was determined by ab initio molecular dynamics calculation using the Vienna Ab initio Simulation Package. Relevant parameters of the calculation include:
Projector augmented wave potentials with a kinetic energy cutoff of 400 eV, the exchange and correlation functionals of Perdew-Burke-Ernzerhof generalized gradient (GGA-PBE), and 200 picoseconds simulation time with a time step of 2 femtosecond.

Shown in FIGS. 7A, 7B, 7C and 7D are Arrhenius plots of diffusion coefficient versus inverse temperature illustrating the results of the calculations on $Li_{6.125}Hf_{1.87}Y_{0.125}O_7$, $Li_{6.5}Hf_{1.5}Y_{0.5}O_7$, $Li_{6.125}Hf_2O_{6.87}N_{0.125}$, and $Li_{6.25}Hf_{1.87}Mg_{0.125}O_7$. As shown, these materials are expected to have activation energies of 0.31 electron volts (eV), 0.20 eV, 0.34 eV, and 0.30 eV, respectively. When extrapolated to 300K, the electrical conductivity of these materials is expected to be 0.06 mS/cm, 4.2 mS/cm, 0.02 mS/cm, and 0.11 mS/cm, respectively.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Group" means a group of the Periodic Table of the Elements according to the International Union of Pure and Applied Chemistry ("IUPAC") Group 1-18 group classification system.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A compound of Formula 1 in a positive electrode, negative electrode or electrolyte, comprising:

$$Li_{(6+(4-a)x+c)}M^{4+}_{(2-x)}A^{a+}_{x}O_{(7-c)}N'_{c} \quad (1)$$

wherein
M is a tetravalent cationic element,
A is a divalent or trivalent cationic element,
N' is an anion Group 15 element,
wherein when A is $Y^{3+}$, $In^{3+}$, $Zn^{2-}$, or a combination thereof, $0.15<x\leq0.5$, otherwise
$0\leq x\leq0.5$, $0\leq c\leq2$, and
$((4-a)x+c)>0$.

2. The compound of claim 1, wherein M comprises an element of Group 4, Group 14, or a combination thereof.

3. The compound of claim 2, wherein M is Zr, Hf, or a combination thereof.

4. The compound of claim 1, wherein A comprises Mg, Ca, Zn, or a combination thereof.

5. The compound of claim 1, wherein A comprises Y, Gd, Ga, In, Al, La, Sc, or a combination thereof.

6. The compound of claim 1, wherein N' is N.

7. The compound of claim 1, wherein $0.1\leq((4-a)x+c)\leq0.4$.

8. The compound of claim 1, wherein the compound is of Formula 2:

$$Li_{(6+2a'-a''+c)}M_{(2-(a'+a''))}A'_{a'}A''_{a''}O_{7-c}N'_{c} \quad (2)$$

wherein
M comprises Zr, Hf, or a combination thereof,
A' is a divalent cationic element,
A" is a trivalent cationic element,
N' is an anion having a valence of less than −2,
wherein when A' is Zn, $0.15<a'\leq0.5$, or when A" is Y or In, $0.15<a''\leq0.5$, otherwise
$0\leq a'\leq0.5$, $0\leq a''\leq0.5$, $0\leq c\leq1$, and
$(a'+a''+c)>0$.

9. The compound of claim 8, wherein A' is Mg, A" is Sc, and N' is N, and wherein $0.1<(2a'+a''+c)<0.3$, $0<a'<0.15$, $0\leq a''<0.3$, and $0\leq c\leq0.3$.

10. The compound of claim 1, having an ionic conductivity of greater than $1\times10^{-7}$ Siemens per centimeter.

11. The compound of claim 7, having an ionic conductivity of $1\times10^{-6}$ to $1\times10^{-2}$ Siemens per centimeter.

12. A component of a lithium secondary electrochemical cell comprising the compound of Formula 1

$$Li_{(6+(4-a)x+c)}M^{4+}_{(2-x)}A^{a+}_{x}O_{(7-c)}N'_{c} \quad (1)$$

wherein
M is a tetravalent cationic element,
A is a divalent or trivalent cationic element,
N' is an anion of a Group 15 element,
wherein when A is $Y^{3+}$, $In^{3+}$, $Zn^{2+}$, or a combination thereof, $0.15<x\leq0.5$, otherwise $0\leq x\leq0.5$, $0\leq c\leq2$, and $((4-a)x+c)>0$.

13. The component of claim 9, wherein the component is an electrolyte.

14. The component of claim 9, wherein the component is in the form of a protection layer on a negative electrode comprising lithium metal, a lithium metal alloy, or combination thereof.

15. An electrochemical cell comprising:
a positive electrode;
a negative electrode; and
an electrolyte between the positive electrode and the negative electrode,
wherein at least one of the positive electrode, the negative electrode and the electrolyte comprise the compound of Formula 1

$$Li_{(6+(4-a)x+c)}M^{4+}_{(2-x)}A^{a+}_{x}O_{(7-c)}N'_{c} \quad (1)$$

wherein
M is a tetravalent cationic element,
A is a divalent or trivalent cationic element,
N' is an anion of a Group 15 element, wherein when A is $Y^{3+}$, $In^{3+}$, $Zn^{2+}$, or a combination thereof, $0.15<x\leq0.5$, otherwise $0\leq x\leq0.5$, $0\leq c\leq2$, and $((4-a)x+c)>0$.

16. The electrochemical cell of claim 14, wherein the negative electrode comprises lithium metal, a lithium metal alloy, or combination thereof, and wherein the compound of Formula 1 is directly on the negative electrode.

17. A method of preparing the compound of claim 1, the method comprising:
contacting a lithium compound, a compound comprising a tetravalent cationic element, a compound comprising at least one of divalent cationic element and a trivalent cationic element to provide a mixture; and
heat-treating the mixture to prepare the compound.

18. A method of manufacturing an electrochemical cell, the method comprising:
providing a negative electrode comprising lithium, a lithium alloy, or combination thereof;
disposing the compound of Formula 1 on the negative electrode;
disposing an electrolyte on the negative electrode; and
disposing a positive electrode on the separator to manufacture the electrochemical cell.

* * * * *